United States Patent [19]

Fjelldal et al.

[11] Patent Number: 5,976,211

[45] Date of Patent: Nov. 2, 1999

[54] FERTILIZER AND PROCESS FOR PRODUCTION THEREOF

[75] Inventors: Erling Fjelldal, Son; Øyvind Vartdal, As; Svein Slangsvold, Hobøl; Pal Jacobsen, Oslo, all of Norway

[73] Assignee: Agronova A/S, Oslo, Norway

[21] Appl. No.: 08/945,171

[22] PCT Filed: Apr. 18, 1996

[86] PCT No.: PCT/IB96/00346

§ 371 Date: Dec. 31, 1997

§ 102(e) Date: Dec. 31, 1997

[87] PCT Pub. No.: WO96/33961

PCT Pub. Date: Oct. 31, 1996

[30] Foreign Application Priority Data

Apr. 25, 1995 [GB] United Kingdom ............... 9508400

[51] Int. Cl.[6] .............................. C05F 11/08; C05F 3/00; C05F 9/00; C05C 17/00
[52] U.S. Cl. ........................ 71/11; 71/12; 71/14; 71/25; 71/903
[58] Field of Search .................. 71/12, 14, 25, 71/54, 58, 59, 11, 60, 903; 210/758, 764

[56] References Cited

U.S. PATENT DOCUMENTS

| 1,550,537 | 8/1925 | Gorbing | 71/25 |
|---|---|---|---|
| 1,922,562 | 8/1933 | Walton | 71/6 |
| 3,867,284 | 2/1975 | Kappe et al. | 210/15 |
| 4,076,515 | 2/1978 | Rickard | 71/10 |
| 4,078,094 | 3/1978 | Katzen | 426/641 |
| 4,602,928 | 7/1986 | Eastin | 71/58 |
| 4,743,287 | 5/1988 | Robinson | 71/12 |
| 5,021,077 | 6/1991 | Moore | 71/17 |
| 5,114,459 | 5/1992 | Peters et al. | 71/32 |
| 5,125,951 | 6/1992 | Lahoda et al. | 71/12 |
| 5,417,861 | 5/1995 | Burnham | 210/609 |
| 5,656,059 | 8/1997 | Monster et al. | 71/7 |

FOREIGN PATENT DOCUMENTS

| 2 632 808 | 12/1989 | France | A01C 3/02 |
|---|---|---|---|
| 2 709 304 | 3/1995 | France | C02F 11/14 |

Primary Examiner—Wayne Langel
Assistant Examiner—Melanie C. Wong
Attorney, Agent, or Firm—Bacon & Thomas, PLLC

[57] ABSTRACT

A process for producing a fertilizer from an organic waste material is described which comprises treating a waste, having a water content of no more than 90% by weight and which has been alkalinized, with nitrogen dioxide or a precursor thereof in sufficient amount to reduce the pH by at least 2.0 pH units. The process produces an organic fertilizer in which the percentage by weight of nitrogen in the form of oxides of nitrogen is higher than percentage by weight of nitrogen in the form of ammonium ion.

31 Claims, 1 Drawing Sheet

FERTILIZER AND PROCESS FOR PRODUCTION THEREOF

BACKGROUND OF THE INVENTION

The invention relates to a fertilizer and to a process for production thereof using as a starting material an organic waste such as, for example, sewage sludge or other organic household, industrial or agricultural waste. The process of the invention produces an organic fertilizer which is stable, does not harm the environment and is nitrogen enriched compared to the original waste. Further, the microorganism count in the final product is well below the safe upper limit set by the various regulatory authorities for such materials and is sufficiently low that the nitrogen content of the fertilizer is not reduced by microbial metabolism prior to application to the soil. The fertilizer of the invention has been shown to be as effective in improving crop yields as conventional inorganic fertilizers.

For many years now inorganic chemical fertilizers have dominated the fertilizer market. It has been more recently recognised, however, that exclusive use of inorganic fertilizers is harmful to the soil's natural ability to microbiologically replenish plant nutrients. They do not contain organic materials to replace top-soil lost through erosion and therefore, on application readily leach into reservoirs, rivers and lakes causing pollution.

In view of these drawbacks the use of fertilizers based on organic material is becoming increasingly popular because they can enrich the soil without substantial harm to the environment. Organic waste materials such as sewage sludge and other organic household, industrial and agricultural wastes are good candidates for turning into organic fertilizers because they are available in huge quantities and disposal of these wastes is, in itself, an environmental problem.

A number of methods are known for converting organic waste materials into organic fertilizers. However, a viable commercial process for production has proved elusive. Ideally, the process should fix or enrich the nitrogen content of the organic waste, hydrolyse organic components to increase their suitability to be metabolized by soil microorganisms and plants and reduce the microbial population of the organic waste. Various approaches have been taken to try and achieve those goals. For example, sterilization or disinfection of organic waste has been achieved by exposing the waste to high temperatures (pasteurization, drying) using an external heat source. Such a treatment, however, does not achieve any nutrient enrichment. Alternatively, the waste may be composted but this takes weeks or months and results in a voluminous material with a high water content which is inconvenient for use as a fertilizer.

Processes for enriching the nutrient content of organic wastes and bringing about hydrolysis of the organic components are also known. For example, U.S. Pat. No. 5,125,951 describes the conversion of ammonia in sewage sludge to thermally stable compounds such as ammonium nitrate and di-ammonium phosphate by treatment with nitric acid or phosphoric acid respectively. Another known method resulting in hydrolysis of the organic components and some disinfection of the waste is to treat the organic waste material with acid to hydrolyse the organic components and to drive down the pH. Thereafter alkali, usually ammonia, is added to raise the pH to one which would be suitable for application to the soil. The addition of ammonia increases the nitrogen content and the aggressive pH changes reduce the microbial count. Procedures using, for example, phosphoric acid or sulphuric acid to acidify the waste are described in U.S. Pat. No. 4,743,287, EP-A-0428014 and WO 91/16280. A similar process in which the acidifying agent is nitrogen dioxide is described in GB-424260.

A common feature of all these prior art processes is that acidification of the waste is carried out first before the addition of alkali to restore the pH to approximately neutral. The present inventors have now made the unexpected discovery that reaction times can be reduced and process efficiency substantially increased if the pH of the raw waste is first raised by adding alkali, followed by acidification with nitrogen dioxide. These efficiency improvements make production of a fertilizer from waste materials commercially feasible, particularly because some wastes, for example, sewage sludge, are often treated with alkali for stabilization and disinfection before transportation and disposal. Further, such a process achieves the dual goals of nitrogen enrichment and disinfection while producing a stable and environmentally acceptable product which may have greater than 50% of the total nitrogen content in the form of nitrites and nitrates.

SUMMARY OF THE INVENTION

Thus, in accordance with a first aspect of the invention there is provided a process for producing a fertilizer from an alkaline organic waste material having a water content of no more than 90% by weight and a pH of approximately 9.0 or above which comprises introducing nitrogen dioxide or a precursor thereof into said alkaline waste material in sufficient amount to reduce the pH by at least 2.0 pH units.

In a second aspect the invention provides a process for producing fertilizer from an organic waste material comprising no more than 90% by weight water which is not pre-alkalinised, by first adding an alkali other than ammonia to the organic waste material in sufficient amount to increase the pH by at least 2.0 pH units and preferably raise it to about 10.0 or above and subsequently introducing nitrogen dioxide ($NO_2$) or a precursor thereof into the material in sufficient amount to reduce the pH by at least 2.0 pH units and preferably reduce it to 8.0 or below.

DETAILED DESCRIPTION OF INVENTION

Figure 1:
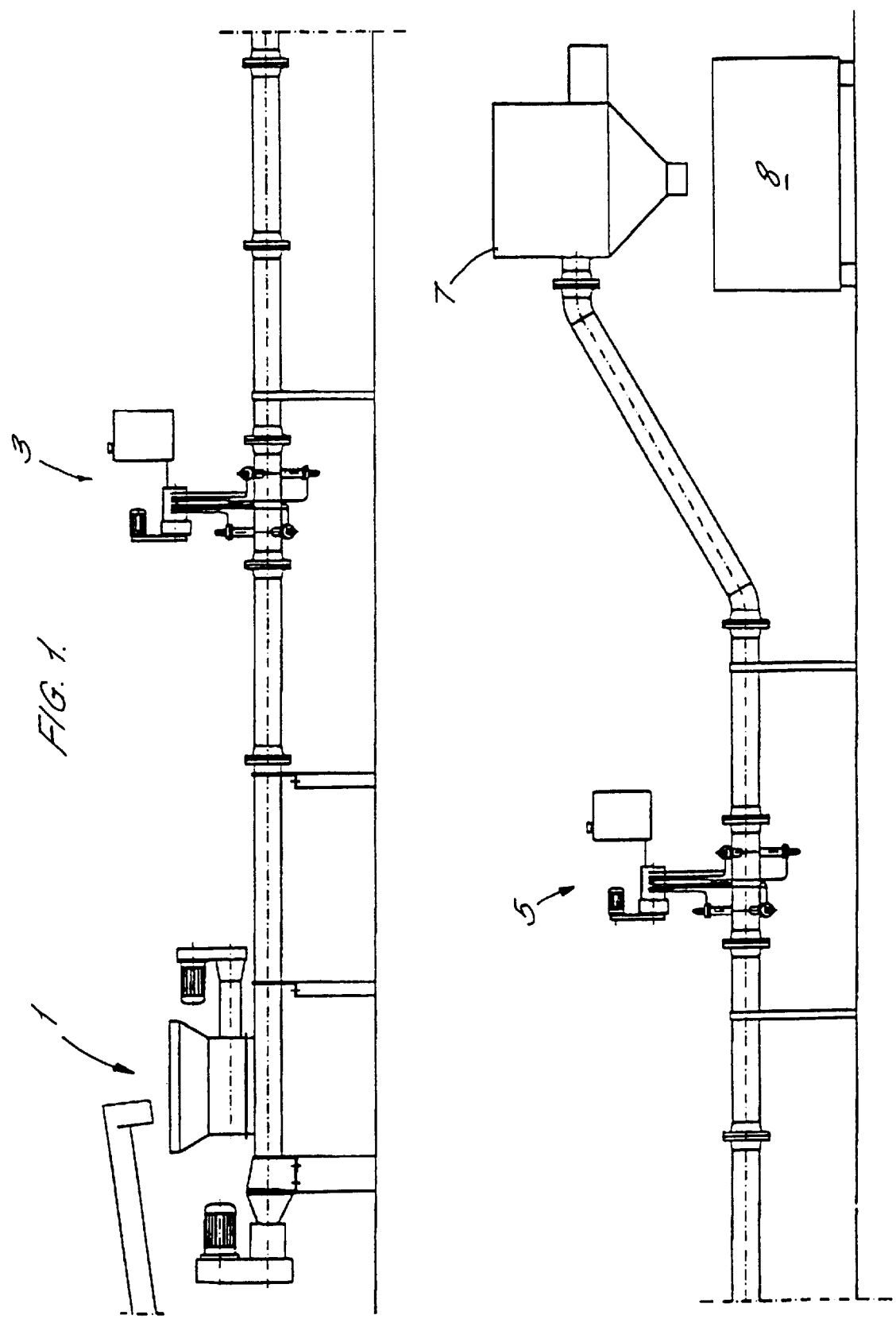
FIG. 1 is a schematic representation of an apparatus for carrying out the process continuously.

Such processes can produce a fertilizer for which the total nitrogen content is from about 5% to about 9% of dry weight which is sufficient for many applications. However, they can be suitably adapted to produce a fertilizer having a total nitrogen content of up to about 15% dry weight. The quantity of $NO_2$ added is usually such as to counteract the pH increase caused by the addition of alkali so that the pH is restored to that of the starting material. The correct stoichiometric amounts of alkali and $NO_2$ required may be easily calculated by the skilled man. By increasing the amount of alkali added more $NO_2$ must be added for neutralization which has the effect of further enriching the waste in nitrogen.

As an alternative a higher overall nitrogen content may be achieved by introducing the $NO_2$ or precursor thereof in excess of that required to restore the pH of the waste to neutral and so increase the level of acidification. Neutrality can then be restored by the introduction of ammonia. This final addition of ammonia further increases the overall nitrogen content and is particularly advantageous for a high nitrogen fertilizer as the low molecular weight in comparison to $NO_2$ allows the nitrogen content of the waste to be increased without substantially increasing the mass. However, because of the volatility of ammonia, it is preferable that the final pH of the product be slightly acid as this mitigates against loss of too much of the ammonia to the atmosphere.

In the organic fertilizers produced in accordance with the processes of the present invention the percentage by weight of nitrogen in the form of oxides of nitrogen, such as, for example, nitrites and nitrates, is higher than the percentage by weight of nitrogen in the form of ammonium ion. This is so even in those embodiments of the invention where ammonia is added in the final stage because the bulk of the nitrogen enrichment is provided by $NO_2$. If ammonia is not added then a fertilizer is produced in which greater than 50% by weight of the total nitrogen is in the form of nitrates and nitrites. This makes the fertilizer of the invention highly potent. Such levels of nitrates and nitrites are not achieved by the known prior art processes for producing fertilizer from organic wastes.

For production of a fertilizer which is suitable for application to the soil and which is easily storable and transportable, following the various process steps described above the waste is usually dried, preferably to a water content of 20% by weight or below. It may be subject to additional processing as discussed further below.

Any industrial, household or agricultural waste is suitable for conversion to a fertilizer in the process of the invention provided it has an organic component and does not include an excessive level of heavy metals and other toxins. Sewage sludge is a particularly suitable starting material whether untreated or alkalinised to render it suitable for transportation and disposal. Preferably, the water content of the waste should be about 50 to 90% by weight and the most suitable materials are those with a solids content of about 20 to 35% by weight. The water content of any organic waste material may of course be appropriately adjusted for use in the processes of the invention.

The processes of the invention may be carried out in a sealed batch reactor either at atmospheric or, preferably, increased pressure until the reaction cycle is completed. Thereafter the pressure may be reduced in order to vent waste gases. Alternatively, the process may be one in which there is a continuous feed of the starting material and continuous withdrawal of the final product, the alkali, $NO_2$ and any other additions being introduced at appropriate injection points along the route of travel of the organic waste. Again, an elevated pressure is preferred during the mixing and reaction stages with a reduction to atmospheric or below for the venting of residual gases at the collection stage. Preferably, the batch reactor or continuous feed apparatus will be insulated against heat losses.

As aforesaid the present inventors have found that waste that has been pre-alkalinised before the addition of the acid confers a number of advantages not present for the previously known processes. The initial alkalization should not be carried out with ammonia because of its volatility when added to waste which has not been previously acidified. Suitable alkaline compounds, for addition however, are calcium oxide (lime CaO), potassium hydroxide (KOH), sodium hydroxide (NaOH), calcium hydroxide (Ca(OH)$_2$) and calcium carbonate (CaCO$_3$). Calcium oxide is the particularly preferred alkali for use in the process of the invention. As mentioned above sewage sludges may be treated at sewage plants with lime (CaO). Further, CaO reacts with water to form Ca(OH), thus having a drying effect on the waste. Calcium phosphate is also formed which becomes water soluble when the pH is restored to neutral with $NO_2$, thus increasing the amount of phosphorus available to plants.

The amount of alkali added must roughly match, in base equivalents, the amount of $NO_2$ added. Where CaO is the sole alkali the amount should be about 60% of the $NO_2$ on a weight basis giving 6-27% of the final product weight. Appropriate amounts of other alkalis can be readily calculated having regard to their molecular weights, base equivalents and dissociation constants.

The addition of an alkali as the first stage in the process of the invention has a number of effects. Firstly, it causes alkaline hydrolysis of organic components in the waste so that they can be more readily metabolised by plants and soil bacteria. Secondly, the chemical reaction results in an increase in temperature of the waste which, depending on the ambient temperature at which the process is being carried out, can have the effect of reducing the microbial population. Thirdly, the pH is increased which facilitates high $NO_2$ uptake in the second stage of the process as well as also having a bactericidal effect.

The alkaline waste produced at the first stage of the process is stable and is partially disinfected. It can be transported and stored without odour or health problems. Further, because low pH is avoided, corrosion problems do not arise. Thus waste which is suitable for turning into fertilizer may be stored in the alkalinised state for some considerable time or can be obtained from a supplier pre-alkalinised.

In all the embodiments of the invention nitrogen dioxide may be introduced into the organic waste material as a liquid or as a gas. Alternatively, a precursor of $NO_2$ may be used such as di-nitrogen tetroxide or other nitrogen oxides or their salts. Liquid $NO_2$ may be bought commercially in bulk but preferably gaseous $NO_2$ is generated on the site of the waste processing apparatus. This allows the spill heat from the gas generator to be used for the drying stage of fertilizer production which has obvious economic advantages. Further, using an $NO_2$ generator which converts $NH_3$ to $NO_2$ provides a direct source of ammonia at the processing site which may be used in the final stage of the process if a high nitrogen fertilizer is required.

When $NO_2$ is added to the reactor it reacts with water to produce nitric and nitrous acid in accordance with the equation:

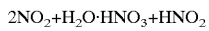

$$2NO_2 + H_2O \cdot HNO_3 + HNO_2$$

The production of nitrous and nitric acids drives down the pH of the slurry towards neutral or below. The amount of $NO_2$ added must be sufficient to drive the pH of the organic waste substantially back to that of the starting material or below. As with addition of lime, because the $NO_2$ reacts with water it has a further drying effect on the waste. The precise amount supplied depends on the level of nitrogen enrichment required and the initial constitution of the waste and will be dictated also by the amount of alkali which has been added. In a typical process run $NO_2$ addition will be about 10 to 45% of final product weight. The desired pH may be achieved by admitting $NO_2$ to a batch reactor over a relatively sort period of 15 to 20 minutes. However the actual treatment time depends on the type of reactor, the pressure applied, the degree of mixing, the particle size of the slurry and the water content of the waste. In continuous rather than batch reactors very short $NO_2$ treatment times of a few minutes may be sufficient.

Further, to improve oxidative processes in the slurry, oxygen may be introduced into the reactor which causes the production of nitric acid to be favoured over nitrous acid. The oxygen may be injected upstream or downstream of the $NO_2$ or co-injected with it.

In addition to the processes described above the waste may optionally require other sorts of treatment at various points either before or after treatment with alkali, $NO_2$ or additional ammonia. For example, before the processing treatment begins it can be advantageous to convert the waste to a slurry of uniform particle size by passing through a cutter or grinder. As it is desired to produce a fertilizer which is well-balanced in nutrients, analysis of the nutrient content of the waste may also be carried out with a view to supplementing either the waste starting material or the fertilizer product where nutrient levels are inadequate. Additional nutrients should be added at an appropriate point during the process and prior to drying. For example, it may be desirable to add nitrogen, phosphorus, calcium, magnesium, sulphur, potassium or the salts thereof and/or other micronutrients. Tests for toxic materials may also be carried out on the waste.

As aforesaid, notwithstanding the drying effects of CaO and $NO_2$, the treated organic waste is further dried, preferably to a water content of 20% by weight or below. Drying may be facilitated using the spill heat from an $NO_2$ gas generating apparatus. The organic fertilizer may be applied to the soil after drying without any further processing but in practice it is better to form the fertilizer into pellets or granules which are easily transportable and practical for the user.

The process of the invention produces an organic waste based fertilizer which is well-balanced, stable, easy to handle and with a high nitrogen content compared with prior art organic fertilizers. In the fertilizer of the invention the nitrogen content will be 5% by weight or greater, preferably between 5 and 15%. The fertilizer is rich in soluble nitrogen-containing compounds in a form suitable for uptake by plants. This gives the fertilizer high potency so that only small volumes need be added per unit area of soil and therefore the presence of heavy metals and toxins in the waste is less problematic. In particular the use of $NO_2$ as the main nitrogen source means that a significant proportion of the non-organic nitrogen is in the form of nitrite and nitrate rather than ammonium ion as with the prior art processes. Nitrites and nitrates give a much more immediate growth effect than ammonia. Furthermore, the fertilizer is of a neutral pH which means that the user does not also need to apply lime to the soil as is the case with the more acidic inorganic fertilizers conventionally used.

As a result of the changes in pH and/or temperature the process of the invention is efficient at reducing the microbial population so that the fertilizer meets the requirements of the regulatory authorities. In a typical process the thermotolerant coliform bacteria (TCB) count is decreased from >2,400 before treatment to <100 after treatment. The safety limit in Norway for use in disposal of sewage sludge in agriculture is 2,500 TCB per gram of dry matter. Thus the process produces an organic fertilizer well within the safety limit.

Field trials have been carried out using the fertilizer of the invention. An increase in availability of organic nitrogen from 10 to 30% to 50 to 70% was observed. Contrary to the use of mineral fertilizers the soil pH remained stable. Further, there were good initial and protracted growth effects and a lower percentage of lodging or flattened crops. Bent or broken straws can hamper cropping and result in inferior quality grain.

The invention will now be described with reference to the following examples:

EXAMPLE 1

1600 g sewage sludge was loaded into a batch reactor to which was added 51.5 g 85% KOH and 56 g CaO. The mixture was stirred until a pH of 11.4 was reached followed by injection of 200 g of $NO_2$ over a period of two hours with intermittant pulses of oxygen until the pH was reduced again to 6.3. During the process the temperature of the waste material increased from 17° C. to 50° C.

Chemical analysis of the starting material and the final product gave the following results.
(1) Total nitrogen increased from 2.3% to 12.1% dry weight.
(2) Nitrogen in the form of nitrate increased from 0.0021% to 10.3% dry weight.
(3) Increased nitrate content accounted for 50 g or 80% of the nitrogen injected.
(4) Nitrogen in the form of ammonium ion decreased from 0.75% to 0.20% dry weight. (No ammonia was added and the loss was mainly due to the high pH combined with atmospheric conditions in this trial).
(5) Dry matter increased from 19.5% to 26.2%.

EXAMPLE 2

2000 g sewage sludge comprising about 400 g dry matter was loaded into a batch reactor and mixed with 78.5 CaO. The mixture was stirred until a pH of 10.3 was reached. 130 g of $NO_2$ was injected into the reactor over a period of 15 to 20 minutes until the pH was reduced to 6.3. During the process the temperature of the waste increased from 3.5 to 8° C. This small temperature rise compared with Example 1 was due to the very low ambient temperatures at which this experiment was carried out and the fact that the reactor vessel was not insulated against heat losses.

Chemical analysis of the starting material and the final product gave the following results:
(1) Total nitrogen increased from 2.5 to 8.5% dry weight
(2) Nitrogen in the form of nitrate and nitrite increased from 0.002 to 6.1% dry weight
(3) Increased nitrate content accounted for 120 g or 92% of the nitrogen injected in the form of $NO_2$
(4) Nitrogen in the form of ammonium ion decreased from 0.5 to 0.4% dry weight
(5) Dry matter increased from 20% to 26%.

EXAMPLE 3

2000 g sewage sludge comprising about 400 g dry matter was loaded into a batch reactor and mixed with 60 g CaO and 20 g KOH. The mixture was stirred until a pH of 10.1 was reached. 105 g $NO_2$ was injected into the reactor over a period of 15 to 20 minutes until a final pH of 8.4 was reached. During the process the temperature of the waste increased from 6.9 to 12° C. The small temperature increase in comparison to Example 1 was for the same reasons described in Example 2.

Chemical analysis of the starting material and final product gave the following results:
(1) Total nitrogen increased from 2.5% to 6.5% dry weight
(2) Nitrogen in the nitrate and nitrite increased from 0.002 to 4.1%
(3) Increased nitrate content accounted for 81 g or 78% of the nitrogen injected in the form of $NO_2$ (4) Nitrogen in the form of ammonium ion remained unchanged.
(5) Dry matter increase from 20% to 24%.

EXAMPLE 4

2000 g sewage sludge comprising about 400 g dry matter was loaded into a batch reactor and mixed with 39.3 g CaO until a pH of 9.9 was reached. 116 g $NO_2$ was then injected into the reactor for a period of 15 to 20 minutes until the pH was reduced to 4.2. 30 g $NH_3$ was then injected into the reactor to produce a final pH of 7.5.

During the process the temperature of the waste increased from 0 to 10° C. The small rise was for the same reasons as given in Example 2.

Chemical analysis of the starting material and the final product gave the following results:
(1) Total nitrogen increased from 2.5 to 10% dry weight
(2) Nitrogen in the form of nitrate and nitrite increased from 0.002 to 5.4% dry weight
(3) Increased nitrate content accounted for 105 g or 92% of the nitrogen injected in the form of $NO_2$
(4) Nitrogen in the form of ammonium ion increased from 0.5% to 3.3% dry weight
(5) The dry matter increased from 20% to 25%.

Microbiology

A microbiological analysis was carried out on the starting material and the final product for each of the Examples 1 to 4. In each case the results were as follows:

Thermotolerant coliform bacteria (TCB) per gram of dry matter decreased from <2,400 before treatment to <100 (detection limit) after treatment.

The above (Examples 1 to 4) exemplify the process of the invention when carried out in batch mode. A suitable apparatus for carrying out the process continuously is shown schematically in FIG. 1 in which 1 is a sludge pump, 3 and 5 are first and second chemical injection pumps which may be used for addition of alkali, $NO_2$ or $NH_3$, 7 is a dryer and granulator and 8 is a receptacle for receiving the finished fertilizer particles.

EXAMPLE 5

A field trial was carried out on an oat crop comprising a fertilizer made in accordance with the present invention and a mineral fertilizer 21-4-10 (NPK). The field contained 28 plots and the trial contained 7 different treatments each of which was repeated 4 times. The treatments comprised mineral fertilizer and the organic fertilizer of the invention at 6, 9 and 12 kg N/1000 m² and a control where no fertilizer was used. The results were as follows:

TABLE I

| Amount of fertilizer-N | | Organic Fertilizer | | | Mineral Fertilizer | | |
|---|---|---|---|---|---|---|---|
| kg/N/1000 m² | 0 | 6 | 9 | 12 | 6 | 9 | 12 |
| Yield | | | | | | | |
| kg grain/1000 m² | 305 | 526 | 603 | 660 | 563 | 637 | 671 |
| kg straw/1000 m² | 291 | 393 | 465 | 507 | 445 | 485 | 510 |
| % lodging | 0 | 1 | 3 | 23 | 5 | 7 | 60 |

As is apparent from Table I the fertilizer of the invention causes a significant increase in crop yield which is only very slightly below the yield with the known mineral fertilizer. However, the yield can be further increased by using the fertilizer of the invention in greater amounts as this is a relatively low cost option compared to increasing the dose of a mineral fertilizer. Further, as can be seen, crop flattening or lodging which is associated with the use of mineral fertilizers is significantly reduced using the fertilizer of the invention.

EXAMPLE 6

A greenhouse trial was carried out to compare the effects of soil pH of the fertilizer of the invention and the fertilizer 21-4-10 (NPK). The results were as follows:

| | Control | Organic Fertilizer | | | 21-4-10 (NPK) | | |
|---|---|---|---|---|---|---|---|
| kg/N/1000 m² | 0 | 10 | 20 | 30 | 10 | 20 | 30 |
| soil pH | 6.09 | 6.09 | 6.08 | 6.10 | 5.96 | 5.95 | 5.93 |

The experiment confirms the pH stability of the fertilizer of the invention in comparison with the mineral fertilizer where increasing amounts cause the soil to become acidified.

We claim:

1. A process for producing a fertilizer from an organic waste material having a water content of no more than 90% by weight and a pH of approximately 9.0 or above which comprises introducing nitrogen dioxide or a precursor thereof selected from the group consisting of other nitrogen oxides or their salts into said waste material in a sufficient amount to reduce the pH by at least 2.0 pH units.

2. A process as claimed in claim 1 wherein the amount of $NO_2$ or precursor thereof added is in excess of that required to restore the pH of said waste to neutrality and the process comprises the additional step of introducing ammonia into said waste.

3. A process as claimed in claim 1 wherein after addition of said $NO_2$ or precursor thereof said waste material is dried.

4. A process as claimed in claim 3 wherein during the drying step the water content of said organic waste material is reduced to 20% or less by weight.

5. A process as claimed in claim 4 wherein the dried organic fertilizer is formed into particles.

6. A process as claimed in claim 1 wherein said organic waste material comprises between 50 and 90% water by weight.

7. A process as claimed in claim 6 wherein said organic waste material has a solids content of between 20 and 35% by weight.

8. A process as claimed in claim 1 wherein prior to the process of fertilizer production, said organic waste material is passed through a grinder or cutter to create a slurry of uniform particle size.

9. A process as claimed in claim 1 wherein prior to the process of fertilizer production, said organic waste material is analysed for content of plant nutrients, metals and toxins.

10. A process as claimed in claim 1 wherein said $NO_2$ is introduced into the organic waste material in the form of a gas or a liquid.

11. A process as claimed in claim 10 wherein said $NO_2$ is co-injected into said organic waste material with oxygen.

12. A process as claimed in claim 10 wherein prior to or after the introduction of said $NO_2$ or precursor thereof oxygen is introduced into said waste material.

13. A process as claimed in claim 1 wherein said $NO_2$ is introduced into the organic waste material as dinitrogen tetroxide.

14. A process as claimed in claim 1 wherein the amount of $NO_2$ added is from about 10% to about 45% by weight of the final product.

15. A process as claimed in claim 1 wherein additional nutrients are added to said organic waste material.

16. A process as claimed in claim 15 wherein the additional nutrients are selected from the group consisting of nitrogen, phosphorus, calcium, magnesium, sulphur, potassium and the salts thereof.

17. A process as claimed in claim 1 which is a batch process carried out in a sealed vessel.

18. A process as claimed in claim 1 which is a continuous process.

19. A process for producing a fertilizer from an organic waste material, said material comprising no more than about 90% by weight water which process comprises the steps of:
   (a) adding an alkali to said organic waste material in a sufficient amount to increase the pH by at least 2.0 pH units and
   (b) introducing nitrogen dioxide ($NO_2$) or a precursor thereof selected from the group consisting of other nitrogen oxides or their salts into the material produced in step (a) in a sufficient amount to reduce the pH by at least 2.0 pH units.

20. A process as claimed in claim 19 wherein said alkali is added in sufficient amount to increase the pH to 10.0 or above and said $NO_2$ or precursor thereof is added in sufficient amount to reduce the pH to 8.0 or below.

21. A process as claimed in claim 19 wherein the $NO_2$ or precursor thereof is added in sufficient amount in step (b) to counteract the increase in pH caused by the alkali added in step (a) so that the pH is substantially restored to that of the starting material.

22. A process as claimed in claim 19 wherein the amount of $NO_2$ or precursor thereof added in step (b) is in excess of that required to restore the pH of the waste to that of the starting material and the process comprises the additional step (c) of introducing ammonia ($NH_3$) into said waste.

23. A process as claimed in claim 22 wherein the material produced in step (c) is dried.

24. A process as claimed in claim 22 wherein prior to, during or after steps (a), (b) or (c) additional nutrients are added to the organic waste material.

25. A process as claimed in claim 2 wherein the material produced in step (b) is dried.

26. A process as claimed in claim 1 wherein said organic waste material is agricultural, industrial or household waste or sewage sludge.

27. A process as claimed in claim 19 therein the alkali added in step (a) is selected from the group consisting of CaO, KOH, NaOH, $Ca(OH)_2$ and $CaCO_3$.

28. A process as claimed in claim 27 wherein the alkali added in step (a) is CaO.

29. An organic waste based fertilizer wherein the percentage by weight of nitrogen in the form of oxides of nitrogen is higher than the percentage by weight of nitrogen in the form of ammonium ion and the water content is not more than 20%.

30. An organic waste based fertilizer as claimed in claim 29 wherein greater than 50% of the total nitrogen content thereof is in the form of nitrates and nitrites.

31. A fertilizer as claimed in claim 29 wherein the thermotolerant coliform bacteria count per gram is less than 2500.

* * * * *